Patented Feb. 13, 1934

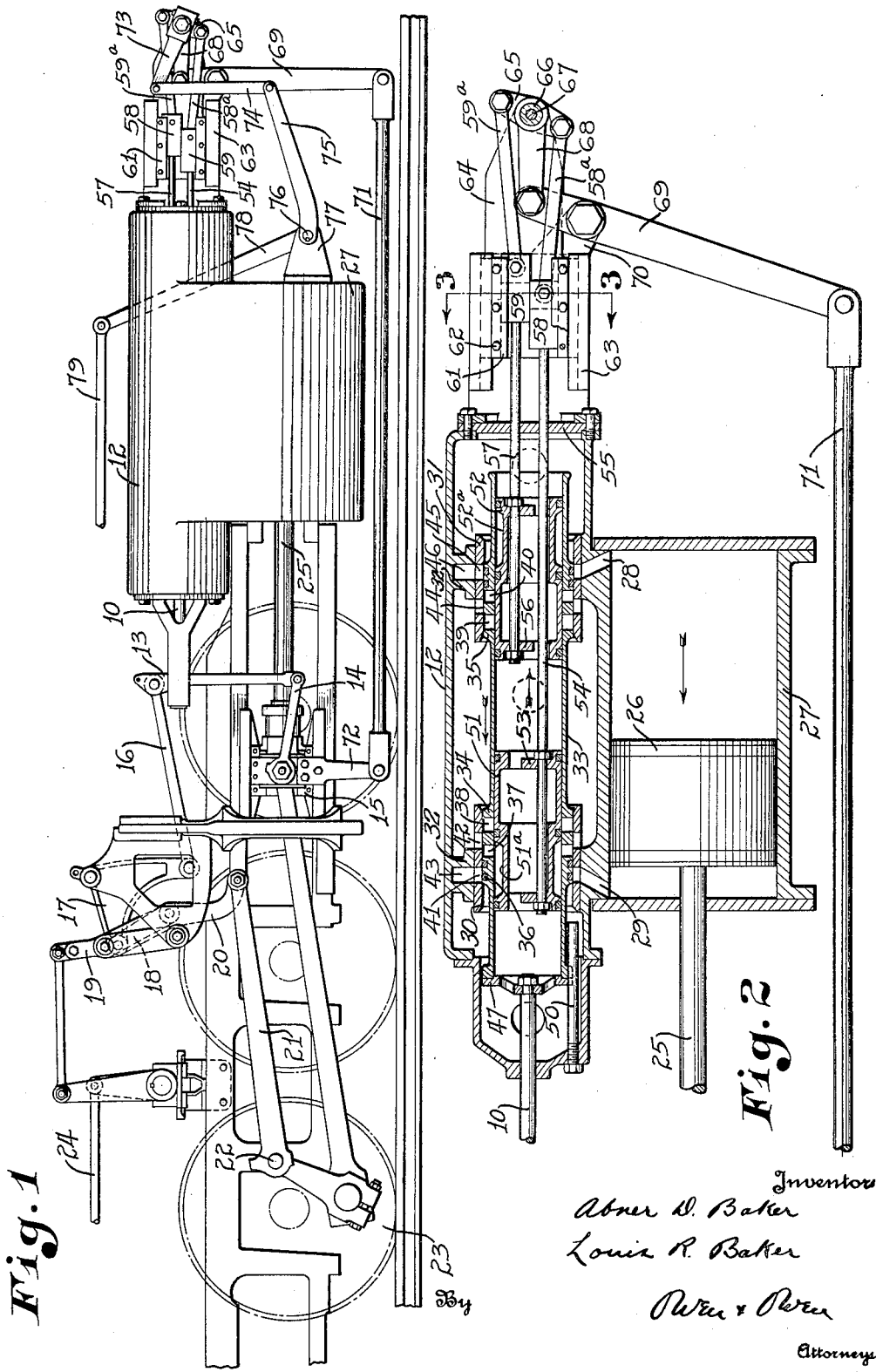

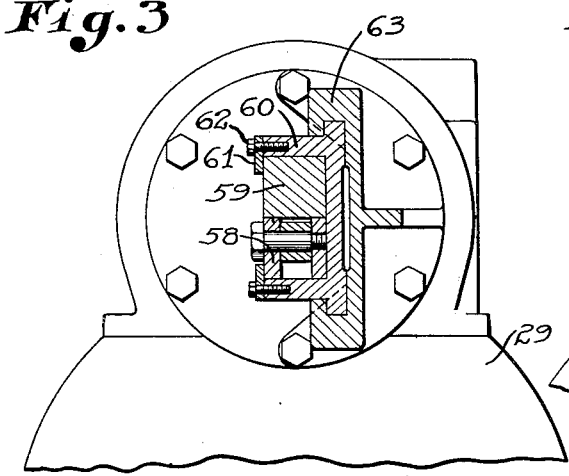
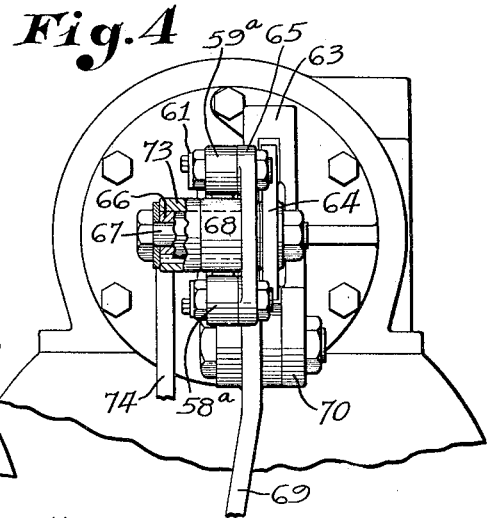
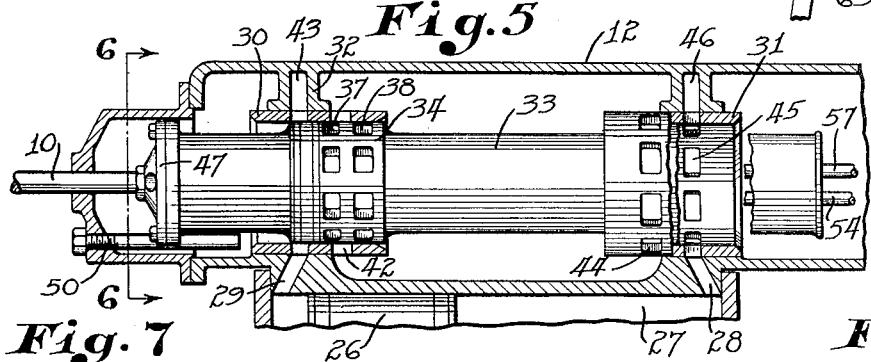
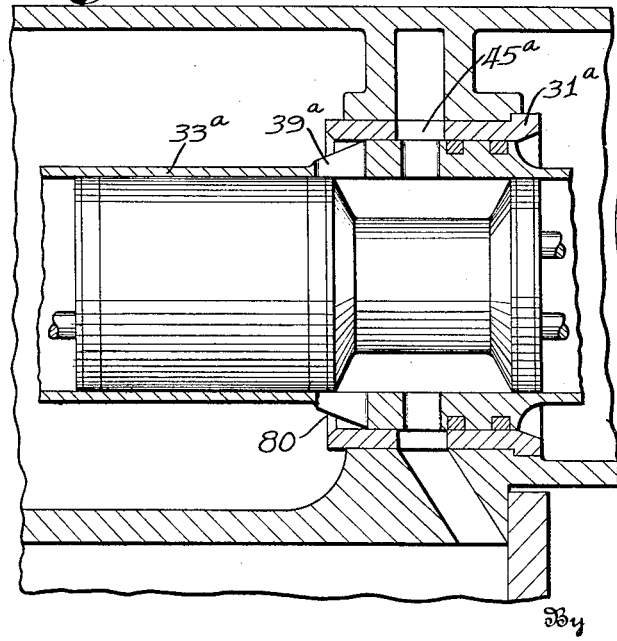
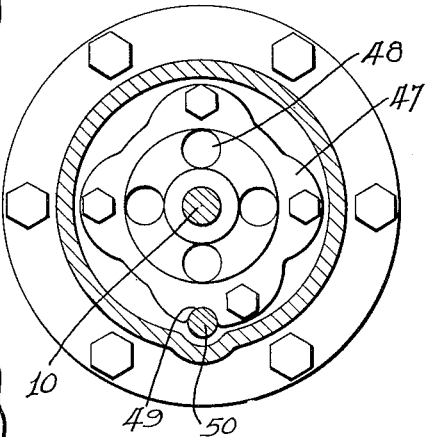

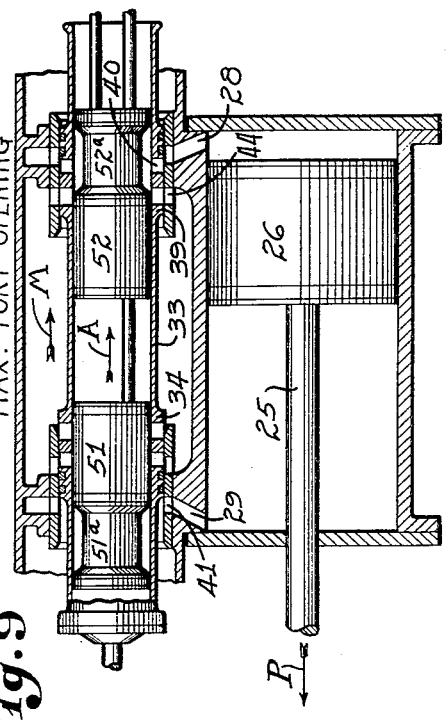
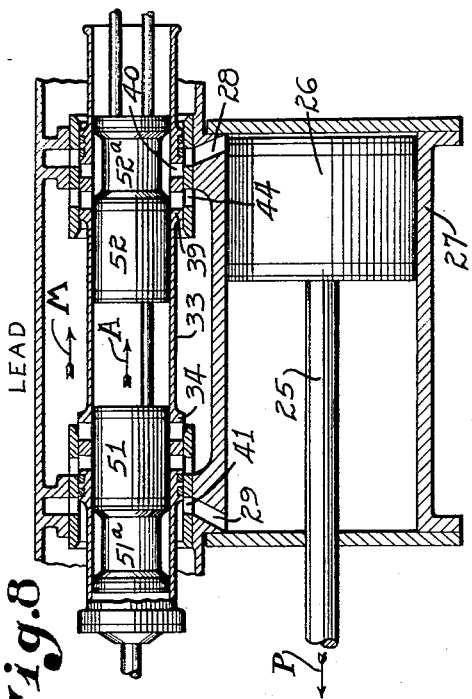
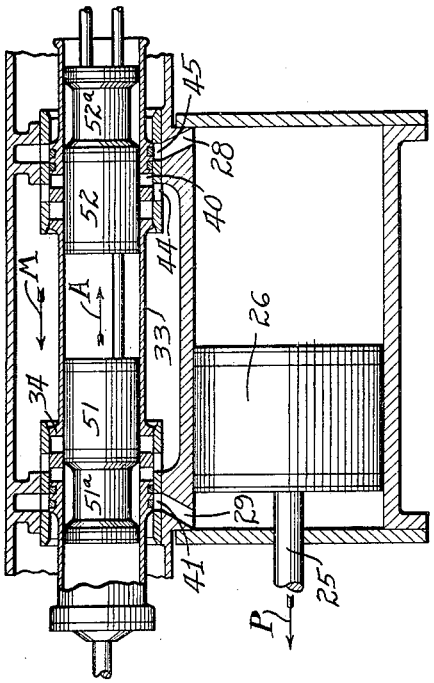
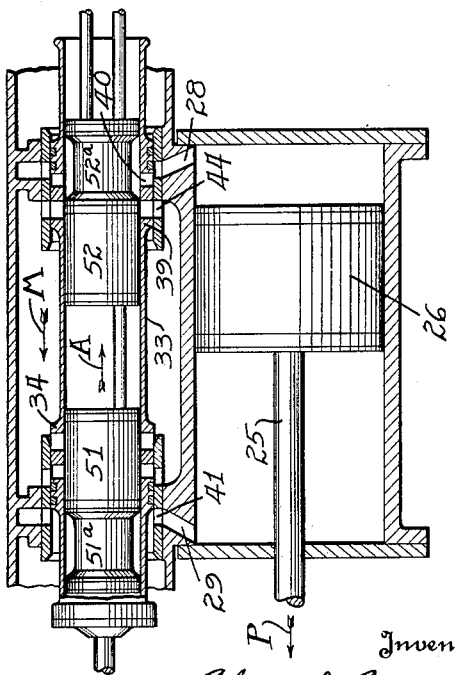

1,946,659

UNITED STATES PATENT OFFICE 1,946,659

ENGINE VALVE GEAR

Abner D. Baker and Louis R. Baker, Swanton, Ohio

Application February 4, 1932. Serial No. 590,824

3 Claims. (Cl. 121—146)

This invention relates to reciprocating piston steam engines but more particularly to reversible engines of this type, such for example as used on locomotives, and an object is to provide a new and improved valve arrangement which can be installed in a simple manner to piston steam engines for increasing their efficiency and power.

Another object is to produce a valve gear for reversing steam engines which is adapted to make more effective use of the expansive force of the steam, thereby reducing the fuel consumption, and is adjustable so as to vary the cut-off in accordance with the demands of service but is so constructed and arranged that regardless of the cut-off a later release is obtained than has heretofore been possible particularly at high or running speeds, and the compression which occurs when the piston approaches the end of its stroke, is delayed to the extent that sufficient steam is trapped to provide only the desired cushion without imposing excessive strain on the working parts.

A further object is to produce a valve and valve gear attachment for reversing piston steam engines for improving the steam admission and exhaust in order to increase the efficiency and power of the engine, such attachment having the new and improved features of construction arrangement and operation hereinafter described.

A still further object is to provide a valve gear for steam engines, particularly locomotives, which can be installed on those that are now in operation but are inefficient and costly to run, and is so constructed and arranged that for comparatively little expense the engine can be rehabilitated to such an extent that its cost of operation is materially reduced and its efficiency greatly improved, the design being such that it can be installed on an engine regardless of the valve gear with which it is equipped and without the necessity of removing such gear or taking it out of operation but rather operating the original gear in conjunction with the new gear.

Other objects and advantages of the invention will hereinafter appear, and, for purposes of illustration but not of limitation, embodiments of the invention are shown in the accompanying drawings, in which:

Figure 1 is a side elevation of a front portion of a steam driven locomotive in which the steam admission valve is actuated by a Baker valve gear, showing the mechanism for actuating the auxiliary valve gear;

Figure 2 is an enlarged vertical sectional elevation of the auxiliary valve and gear, main valve and piston;

Figure 3 is an enlarged transverse sectional elevation on the line 3—3 of Figure 2;

Figure 4 is an end elevation of the auxiliary gear actuating mechanism;

Figure 5 is an enlarged vertical sectional elevation of the valve chest showing the main valve in elevation and some of the parts broken away;

Figure 6 is a transverse sectional elevation on the line 6—6 of Figure 5 showing particularly an arrangement for holding the main valve against turning movements.

Figure 7 is an enlarged vertical sectional elevation of a modified form in which each of the valve bushings is provided with a single row of openings; and Figures 8, 9, 10 and 11 are diagrammatic views showing the positions of the piston and valves at the time of lead, maximum port opening, cut-off and release, respectively.

As shown in the drawings, a valve stem 10 is connected to actuate a spool valve 33, hereinafter more particularly described, which slides horizontally in a valve chest 12. Movement is imparted to the valve stem 10 by a series of links and levers which, in this instance, comprise the Baker valve gear. The Baker valve gear is well known to those skilled in this art, and detail description thereof is not considered necessary.

Suffice it to say that the valve stem 10 is connected to a vertically disposed combination lever 13, which is connected by a union link 14 to the main piston crosshead 15. The upper end of the combination lever above its point of connection with the valve stem 10 is connected to a valve rod 16, which is connected through a bell crank 17, links 18 which are pivoted to a reverse yoke 19, lever 20 and eccentric rod 21 to a crank pin 22 movable with a driving wheel 23 of the locomotive. The reverse yoke 19 may be moved back and forth not only to reverse the movement of the locomotive, but to change the cut-off in accordance with the demands of service. The reverse yoke 19 is actuated by a rod 24 which leads to the cab of the locomotive.

Inasmuch as this invention is not limited to the use of any particular valve gear, it is unnecessary to enter into a more detailed discussion of the construction and operation of the particular valve gear shown on the drawings, since this is shown merely for the purpose of rendering the present invention more easily understandable. As will hereinafter appear, the auxiliary valve gear is not only adapted for use in connection with the Baker gear, but can be used to advantage with a Walschaert, Stephenson, Young or other valve gears, which are well known to those skilled in this art.

The main piston crosshead 15 is connected by a rod 25 to a piston 26, which is reciprocable in a cylinder 27 having communication at its opposite ends with the valve chest 12 through steam ports 28 and 29. Disposed within the valve chest 12 and spaced longitudinally from each other, are bushings 30 and 31 mounted in flanges 32 projecting from the walls of the valve chest. Slidable in the bushings 30 and 31 is a main valve 33 to which the valve stem 10 is connected at one end. The valve 33 is of the spool type and of elongate cylindrical form provided with annular enlargements 34 and 35, which have bearings in the bushings 30 and 31 respectively. Each enlargement is provided with the usual rings 36.

The enlargement 34 is provided with laterally spaced, annular rows of ports 37 and 38. The enlargement 35 is similarly provided with annular rows of ports 39 and 40. The ports 37 and 38 are adapted to register respectively with ports 41 and 42 in the bushing 34, the port 41 communicating with a passage 43 leading to the piston port 29. Likewise, the ports 39 and 40 in the valve enlargement 35 are registrable respectively with ports 44 and 45 in the bushing 35, the port 45 registering with a passage 46 leading to the cylinder port 28.

It is manifest that the valve 33 is reciprocated by the valve stem 10 in the usual manner, live steam being introduced in the usual manner to the central portion of the valve chest and being delivered to one end or the other end of the piston cylinder 27 through the ports 28 and 29, and exhaust steam from the piston cylinder is discharged from the valve chest through the opposite ends thereof, as will be readily understood.

To retain the valve 33 in the desired position and prevent turning movements thereof, the valve stem 10 is secured to a disc 47 having a series of openings 48, the disc being bolted to the adjacent end of the valve 33. Formed in the plate 47 is a groove 49, which fits a guide rod 50 secured to the outer end of the valve chest. The rod 50 in cooperation with the groove 49 causes the valve 33 to travel in a straight path, and prevents turning movement thereof.

Disposed within the valve 33 are cut-off or auxiliary cylindrical valves 51 and 52 which are spaced laterally from each other. At the rearward end of the cut-off valve 51 is a reduced annular or spool portion 51ª whereas the remainder of the valve has a sliding fit within the main valve 33. The valve 52 has a similar spool portion 52ª at its forward end and a rearward extension having a sliding fit with the valve 33. Secured to flanges 53 on the inside of the valve 51 is a valve rod 54 which extends forwardly through the valve 52, and a suitable opening in a plate 55 which closes the forward end of the valve chest. The valve 52 is formed with similar flanges 56, to which is connected a rod 57 extending also through the plate 55. The rods 54 and 57 are connected respectively to relatively movable slide blocks 58 and 59 which are arranged one above the other. The slide blocks are carried by a crosshead 60, in which they are slidable. Gibs 61 secured to the crosshead 60 by bolts 62 retain the slide blocks in place. The crosshead 60 is horizontally reciprocable in a guideway formed in a bracket 63, which is rigidly secured to the front end of the valve chest 12 and projects horizontally outward.

Forming a part of the crosshead 60 and extending forwardly therefrom is an extension plate 64, on the outer end of which is centrally pivoted a lever 65 having an integral sleeve 66 projecting laterally from the central portion thereof. Pivotally connecting the upper end of the lever 65 with the slide block 59 is a link 59ª, and connecting the lower end of the lever 65 with the slide block 58 is a link 58ª. The sleeve 66 is rockable on a bolt 67, which is secured to the outer end of the plate 64.

The auxiliary or cut-off valves 51 and 52 are concomitantly reciprocated by a link 68, which is pivoted at one end to the sleeve 66, and is connected at its opposite end to the upper end of a rock arm 69. The rock arm 69 is pivoted adjacent its upper end to an extension 70 of the bracket 63, and pivoted to the lower end of the arm 69 is a link 71. The link 71 extends below the piston cylinder 27 and is pivoted at its rear end to a vertically disposed arm 72, which is rigidly connected at its upper end to the piston crosshead 15. It is apparent that reciprocating movement of the crosshead imparts conjoint movement to the auxiliary or cut-off valves 51 and 52 through the connections described, and that these valves move in a direction opposite to the movement of the piston 26.

The position of the auxiliary valves 51 and 52 with respect to the main valve 33 may be varied, as desired. As will hereinafter appear, the auxiliary valves may be concomitantly moved toward or away from each other, and when moved closer together a longer cut-off is obtained, but when separated from each other the cut-off is shortened. For this purpose an arm 73 is fixed to the sleeve 66 on the lever 65, which, as above mentioned, actuates the slide blocks 58 and 59. As shown, the arm 73 inclines rearwardly and upwardly, and pivoted to its outer end is a depending link 74, which has a relatively loose connection at its lower end with an arm 75 so that in the reciprocating movement of the auxiliary valve-actuating mechanism, the link 74 may swing to and fro without moving the arm 75. The arm 75 is fixed to a shaft 76, which is journaled in a bracket 77 secured to the forward end of the piston cylinder 27. Likewise fixed to the shaft 76 and extending upwardly and rearwardly therefrom is an arm 78, to the upper end of which is pivoted a link 79. The link 79 may extend to or be coupled with suitable actuating mechanism in the locomotive cab. The connection is such that the arm 75 is held stationary in order to retain the auxiliary valves in adjusted position. It is manifest that rocking movement of the lever 65 in a clockwise direction (Fig. 2) will move the auxiliary valves 51 and 52 away from each other, and rocking movement in a counter clockwise direction will simultaneously move the valves toward each other.

In operation, it is to be understood that the auxiliary valves 51 and 52 only control the cut-off, or in other words, these valves function only to cut off the admission of steam to the piston cylinder 27. The main valve 33 controls the release of steam from the cylinder, the compression or the trapping of steam in advance of the piston 26 to cushion its movement before actuated in the opposite direction, and also the lead, which is the distance between the admission edge of the steam admission port and the corresponding port in the bushing when the piston is at the end of its stroke.

In running at relatively high speeds the gear operating the main valve 33 is set for a relatively long cut-off, which may be between 50% and 65%. The reason for this is that with the main valve 33 operating at a relatively long cut-off the events of release and compression occur late in the movement or position of the piston 26. This affords a late release, so that after the piston has traveled at a sufficient distance under the expansive force of the steam, the exhaust ports are approximately wide open affording comparatively free exit of steam from the cylinder.

The operation of the valves at approximately 20% cut-off is clearly shown in Figures 8, 9, 10 and 11 which show the relative position of the valves with respect to the piston during movement of the latter from one end of the cylinder to the other. Figure 8 shows the position of the parts at lead point, with the piston at the extreme end of the cylinder and the valves in position to admit steam to drive the piston 26 in the direction of the arrow P. In this position, the port 40 of the valve 33 has just uncovered the cylinder port 28, and the port 39 is in register with the bushing port 44, so that live steam may pass through these ports from the inside of the valve chest. The auxiliary valve 52 is in such position that the reduced portion 52ª bridges the ports 39 and 40 so that steam may freely pass into the cylinder 27. It will also be observed that the cylinder port 29 is freely open to the exhaust since the annular enlargement 34 of the main valve 33 has moved forwardly to uncover the bushing port 41. Manifestly, the piston is free to move to the left of the figure with a minimum resistance in front of it.

It will also be noted in Figure 8 that the auxiliary valves move in the direction of the arrow A since, as above mentioned, the auxiliary valves always move in a direction opposite to the movement of the piston. At this time the main valve 33 moves in the same direction as the auxiliary valves, as indicated by the arrow M.

An important advantage derived from the construction and arrangement of the parts directly preceding the lead point is that a quantity of live steam passes from the valve chest through the main valve 33, and is trapped in the space around the reduced portion of the adjacent auxiliary valve. This steam, which is at steam chest pressure, is ready at the instant the adjacent cylinder port is uncovered to pass into the cylinder without traveling through a circuitous route. This effects a slight gain from a standpoint of time in introducing the steam into the cylinder from the valve chest.

Figure 9 shows the position that the various parts assume when the auxiliary gear is adjusted for a 20% cut-off and the main gear a 60% cut-off. It will be observed that a comparatively free passage for steam to the cylinder is provided. In this figure the piston 26 has moved a short distance to the left, and the main and auxiliary valves are moving in the same direction. It is to be understood that these valves do not move at the same rate of speed since the auxiliary valves are actuated by the piston crosshead, whereas the main valve is driven by the usual gear, which holds the valve substantially stationary when it arrives at points of maximum port opening for admission of live steam to the ends of the cylinder, and to exhaust spent steam at the opposite end.

In Fig. 10 the admission of steam in front of the piston has been cut off so that the expansive force of the steam may be utilized for driving the piston toward the opposite end of the cylinder. It is to be noted that the main valve 33 is moving toward the left of Fig. 10, whereas the auxiliary valves are moving in the opposite direction or toward the right of this figure. It is this counter movement of the auxiliary valve which imparts the desired cut-off. Without the auxiliary valve, cut-off would not take place until the piston had traveled a greater distance toward the opposite end of the cylinder. The cylinder port 29 remains uncovered by the main valve so that the piston is free to travel without encountering undue resistance.

The piston 26 continues its movement to the left of Fig. 10 until the main valve 33 has moved to the left a sufficient distance to cover the bushing ports 41 to prevent further exhaust of steam through the cylinder port 29. Substantially at this point or at approximately 12% of its stroke for a 20% cut-off compression takes place, and the steam trapped in rear of the piston cushions the further movement thereof. Upon further movement of the main valve 33 the bushing port 45 is uncovered to release steam from the cylinder through the cylinder port 28.

After the piston 26 has completed its travel through the operation of the valve events as above described, the main and auxiliary valves operate in a reverse manner to drive the piston in the opposite direction. It is not considered necessary to explain this operation but it is believed that this will be readily understood by those skilled in this art. When it is desired to increase or diminish the cut-off, this may be readily accomplished by movement of the cut-off valves 51 and 52 toward or away from each other in accordance with the cut-off desired. Reversing is accomplished by the gear controlling the main valve 33, as will be readily understood. In starting the engine, the main gear is actuated in the usual manner to obtain a relatively long cut-off and the auxiliary gear is accordingly adjusted so that substantially full force of the steam can be utilized.

Obviously, the auxiliary valves 51 and 52 cut off the admission of steam to the cylinder, allow main valve to be adjusted to a late release and compression and close the ports in the main valve for preventing the improper admission of live steam. Examination of Fig. 11 shows that the main valve 33 alone controls the release of steam from the cylinder.

It is apparent that with the main valve 33 adjusted for a relatively short cut-off the release of steam from the cylinder would take place before the piston has traveled a sufficient extent to make full use of the expansive force of the steam. However, when the main valve 33 is adjusted for a relatively long cut-off the release takes place later, and consequently, greater use of the steam can be had when the auxiliary valves work in conjunction with the main valve since the auxiliary valves may be adjusted to cut off much earlier.

An early compression is decidedly objectionable since it imposes excessive strains on the working parts. This objection, however, is overcome by the above described arrangement, since the point of compression can be adjusted to occur much later in the movement of the piston so that just enough steam is trapped in advance of the moving piston to cushion it. The point of compression is controlled by the main valve 33, which, when adjusted to a relatively long cut-off, does not close the exhaust port until the piston has closely approached the end of its movement.

In Figure 7 an alternate form is shown, in which a main valve 33a is provided with steam admission ports 39a, the edges of which are beveled or tapered as indicated at 80, to obtain quick admission of steam. This eliminates the necessity of having two rows of ports in the valve chest bushing and, consequently, the bushing may be shorter than is shown in the other figures. A bushing 31a is in this instance provided with a single row of ports 45a.

It is to be understood that numerous changes in details of construction, arrangement and operation may be effected without departing from the spirit of the invention, especially as defined in the appended claims.

It is further to be understood that although the invention has been described in connection with locomotives, it is not limited thereto since it can be used with any piston steam engine of the reversing or nonreversing type.

What is claimed is:

1. In a steam engine having a cylinder, a piston in said cylinder, and a main crosshead connected to be driven by said piston, a ported sleeve valve, a gear for reciprocating said valve, a pair of cylindrical cut-off valves reciprocable within said sleeve valve, rods connected to said cut-off valves respectively and extending forwardly therefrom, a pair of slide blocks to which the forward ends of said rods are respectively connected, a crosshead in which said blocks are guided, a bracket in which said last crosshead is reciprocable, an extension on said last crosshead, a lever pivoted intermediate its ends on said extension, links connecting opposite ends of said lever and said slide blocks respectively, means for adjusting said lever for concomitantly moving said cut-off valves toward or away from each other, and lever and link connection between said extension and said main crosshead for reciprocating said cut-off valves.

2. In a steam engine having a cylinder, a piston in said cylinder, a main crosshead connected to be driven by said piston, and a valve chest in communication with opposite ends of said cylinder and adapted to admit steam centrally thereof and exhaust steam at opposite ends, a sleeve valve in said valve chest having two laterally spaced rows of ports at each end thereof, ported bushing means in which said sleeve valve operates, said bushing means being so arranged that when said sleeve valve arrives at steam admission points one row of ports is adapted to register with bushing ports and the adjacent row is adapted to receive live steam, a gear for reciprocating said sleeve valve, a pair of cylindrical cut-off valves reciprocable within said sleeve valve, said cut-off valves having adjacent annular portions in sliding contact with said sleeve valve and remote spool portions adapted to control the admission of the steam from said valve chest to the cylinder, and means deriving motion from said main crosshead for conjointly operating said cut-off valves.

3. In a steam engine having a cylinder, a piston in said cylinder, a main crosshead connected to be driven by said piston, and a valve chest in communication with opposite ends of said cylinder and adapted to admit steam centrally thereof and exhaust steam at opposite ends, a sleeve valve in said valve chest having two laterally spaced rows of ports at each end thereof, ported bushing means in which said sleeve valve operates, said bushing means being so arranged that when said sleeve valve arrives at steam admission points, one row of ports is adapted to register with bushing ports and the adjacent row is adapted to receive live steam, a gear for reciprocating said sleeve valve, a pair of cylindrical cut-off valves reciprocable within said sleeve valve, said cut-off valves having adjacent annular portions in sliding contact with said sleeve valve and remote spool portions adapted to control the admission of steam from said valve chest to the cylinder, rods connected to said cut-off valves respectively and extending forwardly therefrom, a pair of slide blocks to which the forward ends of said rods are respectively connected, a crosshead in which said blocks are guided, a bracket in which said last crosshead is reciprocated, an extension on said last crosshead, a lever pivoted intermediate its ends on said extension, links connecting opposite ends of said lever and said slide blocks respectively, means for adjusting said lever for concomitantly moving said cut-off valves relatively to each other, and a lever and link connection between said extension and said main crosshead for reciprocating said cut-off valves.

ABNER D. BAKER.
LOUIS R. BAKER.